(12) United States Patent
Hui et al.

(10) Patent No.: US 9,811,940 B2
(45) Date of Patent: Nov. 7, 2017

(54) BANDWIDTH REDUCTION USING VERTEX SHADER

(71) Applicant: Qualcomm Innovation Center, Inc., San Diego, CA (US)

(72) Inventors: Shiu Wai Hui, Richmond Hill (CA); Yida Wang, North York (CA); Stewart Chao, Markham (CA)

(73) Assignee: QUALCOMM Innovation Center, Inc., San Diego, CA (US)

( * ) Notice: Subject to any disclaimer, the term of this patent is extended or adjusted under 35 U.S.C. 154(b) by 104 days.

(21) Appl. No.: 14/855,064

(22) Filed: Sep. 15, 2015

(65) Prior Publication Data

US 2016/0140737 A1 May 19, 2016

Related U.S. Application Data

(60) Provisional application No. 62/081,977, filed on Nov. 19, 2014.

(51) Int. Cl.
*G06T 11/00* (2006.01)
*G06T 15/04* (2011.01)

(52) U.S. Cl.
CPC .................................. *G06T 15/04* (2013.01)

(58) Field of Classification Search
None
See application file for complete search history.

(56) References Cited

U.S. PATENT DOCUMENTS 6,236,405 B1 * 5/2001 Schilling ................. G06T 15/04
345/582

* cited by examiner

*Primary Examiner* — Edward Martello
(74) *Attorney, Agent, or Firm* — Neugeboren O'Dowd PC

(57) ABSTRACT

In graphics rendering, a texture tile is divided into a plurality of partitions, each partition having a plurality of vertices. A map indicates, for each partition, whether each partition comprises a constant color. Then the plurality of vertices are transferred to a vertex shader, which determines that at least one of the partitions comprises a constant color partition. A vertex shader applies a vertex transformation that associates a set of texel coordinates from the texture tile to each of the vertices of the constant color partition to generate a set of associated texel coordinates. A first coordinate of the set of associated texel coordinates is set to zero. A pixel shader interpolates the associated texel coordinates to generate an interpolated value and accesses a single texel in the constant color partition that corresponds to the interpolated value.

20 Claims, 10 Drawing Sheets

BANDWIDTH REDUCTION USING VERTEX SHADER

CLAIM OF PRIORITY UNDER 35 U.S.C. §119

The present Application for patent claims priority to Provisional Application No. 62/081,977 entitled "BANDWIDTH REDUCTION USING VERTEX SHADER" filed Nov. 19, 2014, and assigned to the assignee hereof and hereby expressly incorporated by reference herein.

FIELD OF THE DISCLOSURE

The present invention relates to content display devices. In particular, but not by way of limitation, the present invention relates to apparatus and methods for improving the display of content on content display devices.

BACKGROUND

Content display devices such as smartphones, netbooks, gaming devices, PDAs, desktop computers, televisions, and laptop computers are now ubiquitous. These devices commonly include hardware providing network connectively to web servers, and software (e.g., web browsers) providing an interface for users to request and view content from the web servers.

Some content provided by the web servers, and displayed on these content display devices, is increasingly dynamic in nature while other content remains relatively simple. In addition to graphically intensive games, for example, it is very common for a variety of content associated with a webpage to include animations, which may be carried out by rendering a series of bitmap images to create the appearance of motion. Internet webpages often have pictures and video images to render. Often, coupled with graphically intensive images are images that are simpler to render. These might include, for example, a solid blue sky or a solid gray background of the webpage. Common and ongoing issues with the display of this type of content are maintaining the quality of a user's experience while managing limited resources.

More specifically, users have become accustomed to viewing animated content in a smooth, fast, and uninterrupted manner. Although content display devices continue to be produced with more and more advanced graphics processing resources, these resources are often still not fast enough to provide seamless, consistent animation. Moreover, these advanced content display devices often demand more power, which is often limited. As a consequence, many current devices often perform less than desirably, and the user experience will almost certainly suffer further from performance deficiencies in the future.

SUMMARY

One aspect of the present disclosure may be described as a method for rendering computer graphics onto a screen. The method may comprise dividing, at a processor, a texture tile into a plurality of partitions, each partition having a plurality of vertices and creating a map that indicates, for each partition, whether each partition comprises a constant color. Then, the method may comprise transferring the plurality of vertices to a vertex shader and determining, by the vertex shader, that at least one of the partitions comprises a constant color partition. Next, the method may include applying a vertex transformation that associates a set of texel coordinates from the texture tile to each of the vertices of the constant color partition to generate a set of associated texel coordinates, and associates each of the vertices to at least one pixel on a display. The method further includes setting a first coordinate of the set of associated texel coordinates to zero. Once the first coordinates are set to zero, the method may further include interpolating, at a pixel shader, the associated texel coordinates to generate an interpolated value, accessing, from a memory, a single texel in the constant color partition that corresponds to the interpolated value that applies to a plurality of the pixels on the display, and applying, to the plurality of pixels on the display, a color from the single texel.

Another aspect of the disclosure may be described as a graphics rendering device which may comprise a processor configured to divide a texture tile into a plurality of partitions, each partition having a plurality of vertices, and create a map that indicates, for each partition, whether each partition comprises a constant color. The device may also comprise a memory configured to store the plurality of vertices and the texture tile, as well as a display. The device may also comprise a vertex shader configured to determine that at least one of the partitions comprises a constant color partition, The vertex shader may be further configured to apply a vertex transformation that associates a set of texel coordinates from the texture tile to each of the vertices of the constant color partition, associates each of the vertices to pixels on the display, and sets a first coordinate of the set of associated texel coordinates to zero. Finally, the device may comprise a pixel shader configured to interpolate the associated texel coordinates to generate an interpolated value, access, from the memory, a single texel in the constant color partition that corresponds to the interpolated value that applies to a plurality of the pixels on the display, and apply, to the plurality of pixels on the display, a color from the single texel.

Another aspect of the disclosure may be described as a non-transitory, computer readable storage medium, encoded with processor readable instructions to perform a method for rendering computer graphics onto a screen. The method may comprise dividing, at a processor, a texture tile into a plurality of partitions, each partition having a plurality of vertices and creating a map that indicates, for each partition, whether each partition comprises a constant color. Then, the method may comprise transferring the plurality of vertices to a vertex shader and determining, by the vertex shader, that at least one of the partitions comprises a constant color partition. Next, the method may include applying a vertex transformation that associates a set of texel coordinates from the texture tile to each of the vertices of the constant color partition to generate a set of associated texel coordinates, and associates each of the vertices to at least one pixel on a display. The method further includes setting a first coordinate of the set of associated texel coordinates to zero. Once the first coordinates are set to zero, the method may further include interpolating, at a pixel shader, the associated texel coordinates to generate an interpolated value, accessing, from a memory, a single texel in the constant color partition that corresponds to the interpolated value that applies to a plurality of the pixels on the display, and applying, to the plurality of pixels on the display, a color from the single texel.

DETAILED DESCRIPTION

In the field of computer graphics, software developers, device manufacturers, and consumers continue to seek improvements in image quality, processing speed, and realism. The demands and expectations of such quality extend increasingly to mobile devices, such as smartphones and tablets. Constraints on memory, processing power, and battery power in mobile devices require graphics pipeline rendering techniques providing increased graphics quality while conserving as much memory bandwidth, processing power, and battery power as possible.

Many images displayed on a user's screen contain large areas of a constant color, or which appear blank to a user. For example, in a game application, there may be large areas of sky having a constant blue color. Other examples include webpage documents and word processing documents having lines of text superimposed upon solid-color backgrounds such as white or gray. Often, the methods used to render complex images are the same as those used to render the simple solid-color images. As a result, screen images having large amounts of a constant color are as expensive to process as complex areas, contributing to inefficiency and wasted resources.

Figure 1:
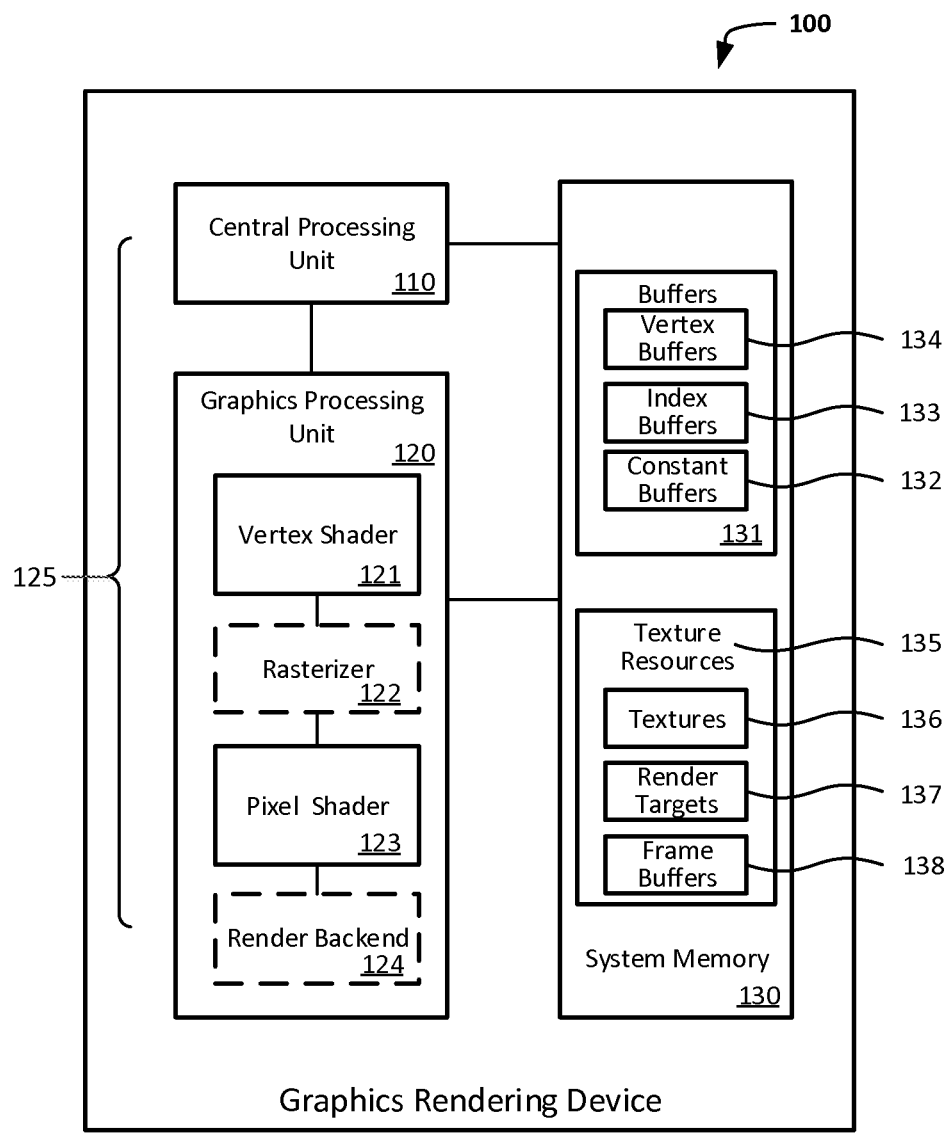
FIG. 1 is a logical block diagram of a graphics rendering device according to aspects of the present disclosure.

Conventional rendering of images onto a screen may be accomplished using what is known in the art as a "graphics rendering pipeline," which may be referred to throughout this disclosure as a "pipeline." FIG. 1 is a logical block diagram of a graphics rendering device 100, which includes components for implementing a graphics rendering pipeline 125. A pipeline may be implemented by hardware components, by hardware components in combination with software components, or by software components alone. The graphics rendering device 100 may include a central (or command) processing unit (CPU) 110, a graphics processing unit 120, and a system memory 130. The graphics processing unit (GPU) 120 may include a vertex shader 121, a rasterizer 122, a pixel shader 123, and a render backend 124. The rasterizer 122 and the render backend 124 are components known in the art to be common to nearly every graphics rendering pipeline, and are included for context rather than for substantive contribution to the present disclosure. Embodiments of the present disclosure may be used in conjunction with other engines of sophisticated pipelines, which are not depicted herein for the purposes of simplicity. For example, many pipelines include tesselators, hull shaders, and domain shaders in addition to components shown in pipeline 125 of FIG. 1. Further, certain components of FIG. 1 may have different names than those listed herein. In particular, the pixel shader 123 is commonly known as a "pixel shader" when using the application programming interfaces (API) and/or programming language associated with DirectX from Microsoft, but the pixel shader 123 is commonly known as a "fragment shader" in the API and programming language associated with OpenGL, which is an open-source platform. It is contemplated that aspects of the present disclosure may be implemented using either of these APIs or programming languages, and by other graphics APIs or programming languages as well.

Together, the central processing unit 110 and the graphics processing unit 120, and the components depicted therein, comprise a graphics rendering pipeline 125 as known in the art. The components of the graphics rendering pipeline 125 may utilize information stored in system memory 130 throughout various points in the pipeline, which will be described in more detail presently. Information stored in system memory 130 may be stored more specifically in various buffers 131, which include vertex buffers 134, index buffers 133, and constant buffers 132. Those skilled in the art will appreciate that aspects of the present disclosure, particularly the vertex shader 121, may utilize the buffers 131 to apply vertex transformations, as will be discussed later in this disclosure. Additionally, texture resources 135 may also be stored in system memory 130, including textures 136, render targets 137, and frame buffers 138. Components in the graphics rendering device 100 and their interactions will be described throughout the disclosure. The graphics processing device 100 depicted in FIG. 1 includes the structures most relevant to the present disclosure, but devices according to embodiments of this disclosure may include many additional components, including those illustrated in the diagram of the computing device 800 in FIG. 8.

In graphics processing, particular geometries are sometimes rendered onto a screen by first dividing the geometry into "quads," which may also be known as "tiles." The term "geometry" is known in the art of computer graphics as any two-dimensional ("2D") or three-dimensional ("3D") shape, such as a 2D plane, square, rectangle, triangle, circle, or a 3D sphere, cube, pyramid, etc. Geometries are typically defined, in part, by their vertices, which may be thought of as points in 2D or 3D space, as well as by pixels on the screen upon which the geometries are ultimately rendered. For 3D geometries, multiple triangles (triangles having three vertices) are typically used to make up a geometry. 2D geometries, such as those on a flat plane or a page of a rectangular document, are often divided up using quads. Each such quad may comprise two co-planar triangles that, together, form a single rectangle. For example, FIG. 2 shows a webpage document 200, as it might ultimately be rendered to a screen, that is divided up into multiple screen image quads 201, 202, 203, 204, 205, and others not numbered in this figure.

At the beginning of the graphics rendering pipeline, the CPU 110 may initially divide a document (or other geometry) into screen image quads 201-205, each of which having four vertices which may ultimately be transformed by the vertex shader 121 into pixel coordinates on a screen. The "screen image quad" may be thought of as a conceptual way to define vertices which exist on the CPU 110 and in the system memory 130 and which may be transformed by the vertex shader 121 to pixel coordinates on a screen, at which time each vertex of a screen image quad is represented by four corners of a quad on a screen. In other words, the vertices defined as quad corners may ultimately be mapped to a variety of pixel locations depending on whether the image is rendered, for example, to a small mobile device screen or a large desktop screen. The division of the geometry into screen image quads (and corresponding vertices) may be based on an existing division of "texture tiles" as they are received by the system memory 130. (A texture, also known as a color map or a bitmap, is a tool known in the art and used to add color to a surface on a screen. A texture may be divided into tiles, thereby creating "texture tiles.") By way of example, an image to be rendered may have been recently downloaded from the Internet, and the bitmap files comprising the texture tiles may be stored in volatile memory (such as RAM) briefly before being recognized by the CPU 110 as texture tiles to be mapped correspondingly to a screen. In some cases tiles of a particular texture are never rendered on screen. For example, tiles outside of a particular viewport are sometimes pre-rendered to improve performance. For the purpose of clarity, a "screen image quad" and a "texture tile" will be referred to as two distinct concepts, although they are highly related and often indistinguishable in implementation.

Figure 2:
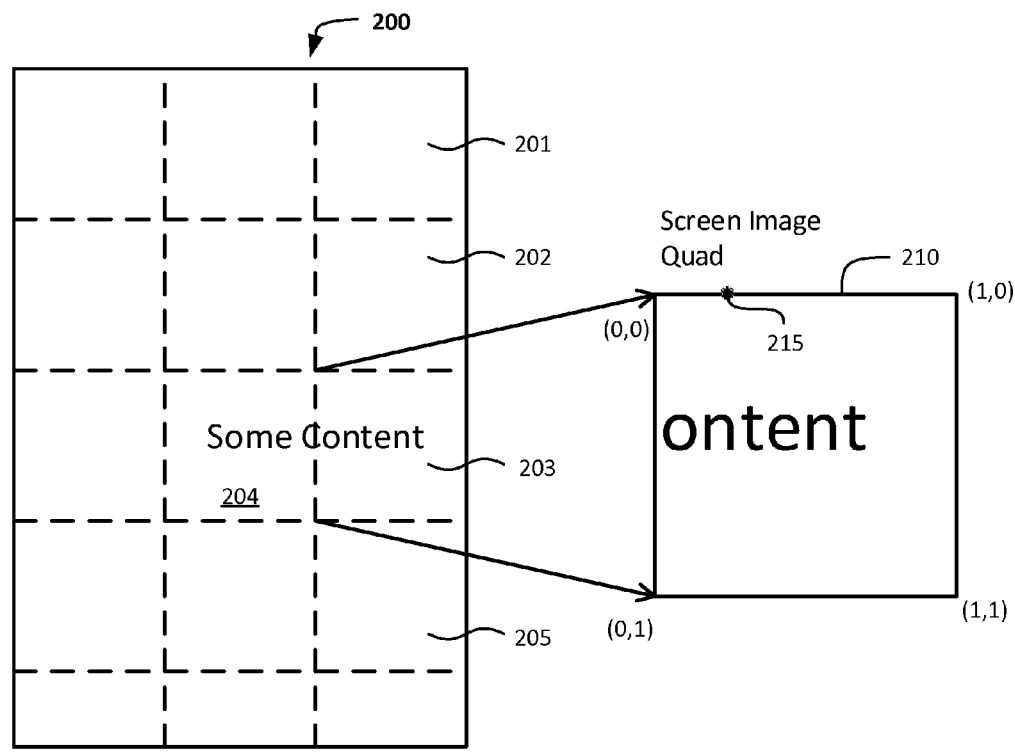
FIG. 2 is a depiction of how an image on a screen may be divided into quads in a graphics rendering process according to aspects of the present disclosure.

In the example depicted in FIG. 2, the webpage document is mostly blank, having a white background. That is, screen image quads 201, 202, and 205 are blank, and screen image quads 203 and 204 have some blank space and text comprising the words "Some Content."

Typically, the color that is ultimately rendered to the screen on each pixel is determined in steps by several components in the graphics pipeline. As discussed previously, a way to add color to a pixel, or to an entire geometry on a screen, is to map a texture, (e.g., a bitmap file) onto coordinates on a screen, as known in the art. Referring back to FIG. 1, textures 135 which comprise the colors that will ultimately be rendered on a screen may be stored in the system memory 130, where they may be accessed or "fetched" by the vertex shader 121 and/or the pixel shader 123 when the textures 135 are to be rendered. A problem with conventional methods is that multiple texture fetches between the system memory 130 and the vertex shader 121, the pixel shader 123, and the CPU 110 may consume a large amount of memory bandwidth. Textures, in particular, are divided into texture tiles corresponding to the screen image quads, each having many "texels" at various texel coordinates. The term "texel" is known in the art and refers to a pixel (or pixel coordinate) of a texture or a texture tile. The term is used to differentiate between references to coordinates of actual pixels on a display screen and coordinates of pixels on a texture tile. Each texel of a texture tile may be stored at a different location in the system memory. More memory bandwidth is consumed by fetching texels from multiple locations as opposed to fetching them from one location.

Figure 3:
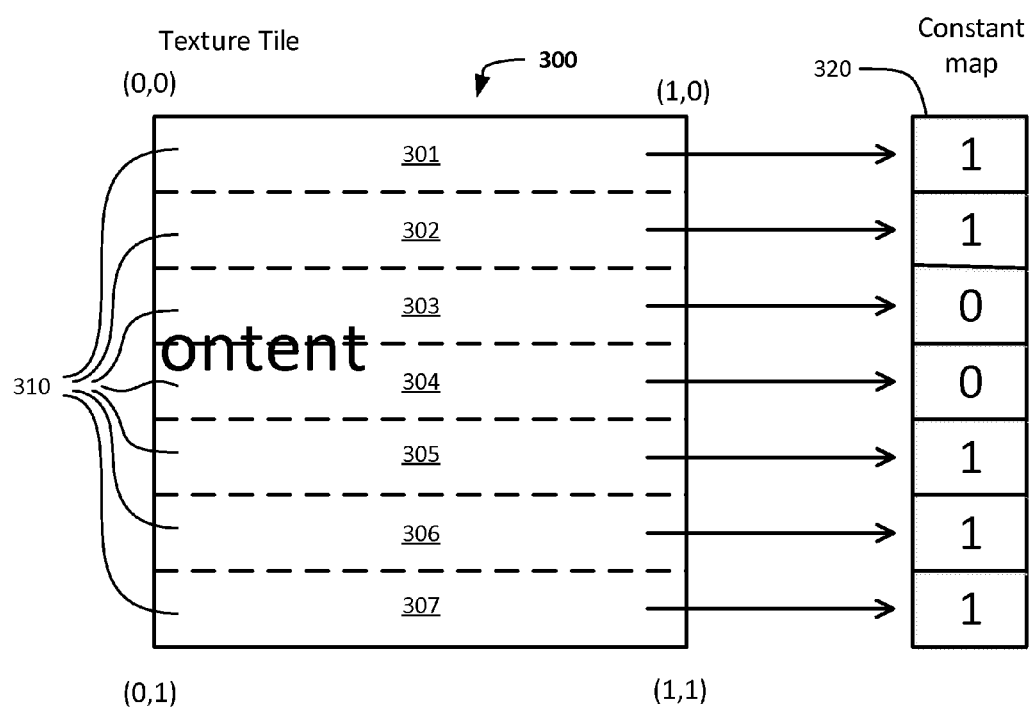
FIG. 3 is a depiction of how a partitioned texture tile may be used to create a map of the partitions according to an aspect of the present disclosure

Referring to FIG. 3, the textures 135 may contain a texture tile 300, which has texel coordinates. To differentiate between pixel coordinates and texel coordinates, which may have similar numerical designations, this disclosure will refer to each as "pixel coordinates" to identify the location of pixels on a screen or screen image quad (even though a screen image quad is not defined by pixels until its vertices are transformed to pixel coordinates), and "texel coordinates" to identify a location on a texture tile, such as texture tile 300 and other textures 135 stored in system memory 130. In the art, various naming conventions exist for coordinates within different graphics programming languages such as DirectX and OpenGL, such as "(x,y)," "(u,v)," and "(s,t)" all of which may be normalized to numerical values such as (0,0) and (1,1), for example. To avoid confusion, this disclosure will specify "pixel coordinates" and "texel coordinates" and the numerical values as appropriate, but may refer to the first coordinate of a texel coordinate as an "x" coordinate and the second coordinate as a "y" coordinate. For example, in FIG. 2, the screen image quad 210 may have pixel coordinates of (0,0) as the top left, (1,0) as the top right, (1,1) as the bottom right, and (0,1) as the bottom right. In FIG. 3, the texture tile 300 may have texture coordinates of (0,0) as the top left, (1,0) as the top right, (1,1) as the bottom right, and (0,1) as the bottom left. Throughout this disclosure, when four coordinates are listed together, they will be listed clockwise from the top left.

It is contemplated that in many embodiments, a single screen image quad may comprise thousands of pixels. For example, a small screen image quad may be 256 pixels tall by 256 pixels wide. As customary in the art, the coordinates of a single quad or tile will be normalized to (0,0) (1,0), (1,1), and (0,1) when describing the single quad or tile. A coordinate between any of the vertices of a single quad or tile may be expressed as a decimal, but for ease of reference may also be expressed as a fraction. For example, the pixel 215 in FIG. 2 may be the $16^{th}$ pixel to the right of the pixel at (0,0) out of 256 pixels in the screen image quad 210. Therefore, the pixel 215 pixel coordinate may be represented as (16/256, 0), or (0.0625,0).

An aspect of the present disclosure is that the CPU 110 may look at the texture tile 300 and partition the texture tile into a number of texture tile partitions 310 and create a second texture known as a constant color map 320. The constant color map 320 may alternatively be referred to as a "constant map," a "blank partition lookup map," or a "lookup map." This constant color map 320 may be stored as a texture 135 in the system memory 130. One purpose of partitioning the texture tile into multiple partitions 310 is to categorize each partition 310 as either "blank" or "non-blank," the benefit of which will become apparent throughout the disclosure. For example, if the texture tile 300 represents the coloring of a white document with black text, partitions 301, 302, 305, 306, and 307 may be categorized as "blank," and partitions 303 and 304 may be categorized as "non-blank" because partitions 303 and 304 have the black text displaying portions of the word "content." Alternatively, the partitions may be categorized as "constant," (as in constant color) and "non-constant." For example, if most of the partitions represented a solid color blue sky, those partitions would be "constant," and if one or more partitions had the solid color blue sky but also part of an image of a tree, those partitions would be "non-constant" or "non-blank."

The constant map 320 may be another texture (e.g., a bitmap file), created by the CPU 110, which corresponds to the partitions by assigning blank partitions a value of "1" and non-blank partitions a value of "0." As shown in FIG. 3, blank partitions 301, 302, 305, 306, and 307 each correspond to a value of "1" in the constant map 302 and non-blank partitions 303 and 304 each correspond to "0" in the constant map. Those skilled in the art will appreciate that the constant map 320 may be a smaller file and take up less space in memory than a corresponding texture tile 300, since it only has one value for each partition. Although the values are represented as 1 and 0, any designation resulting in a yes or no, or true or false statement may be used to create a constant map in other embodiments. It is contemplated that another type of location in memory other than a texture file may be used to create a constant map, such as a lookup table.

Figure 4:
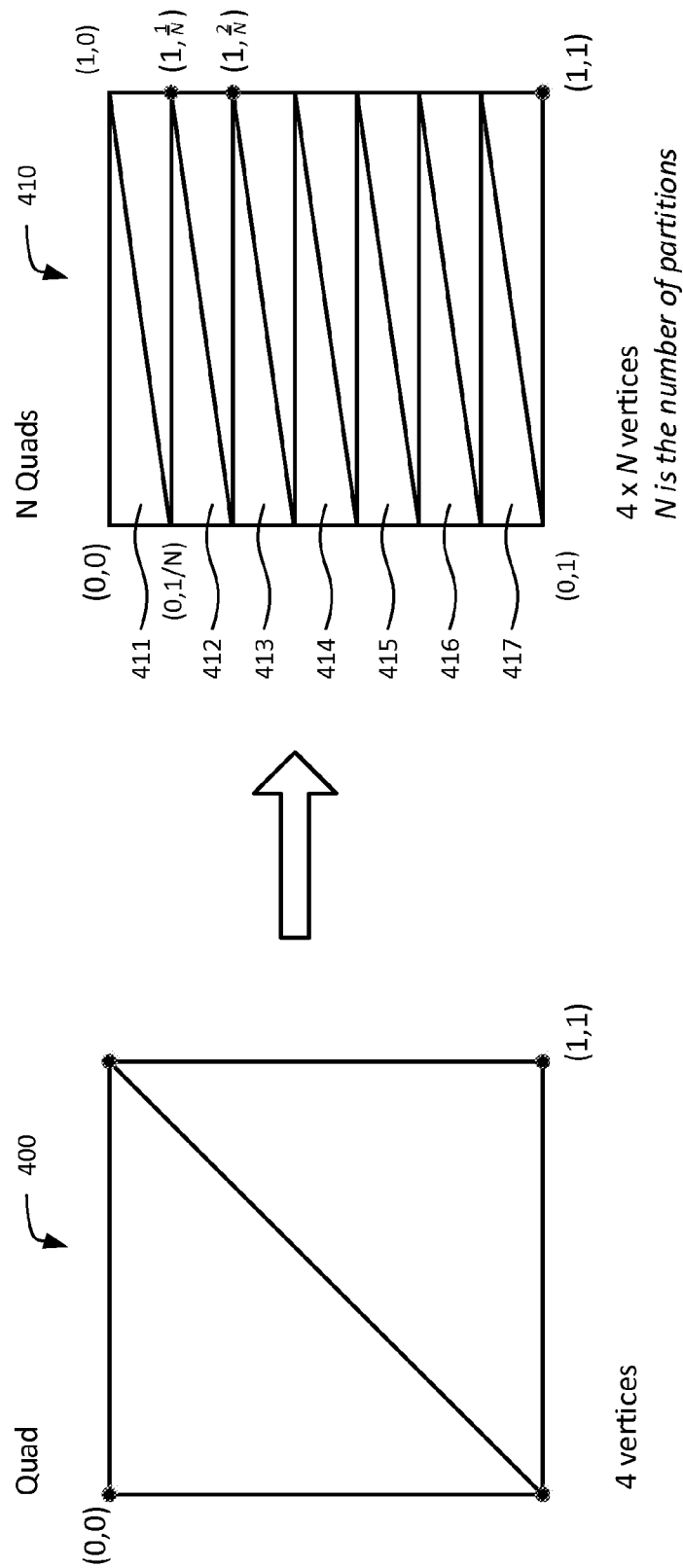
FIG. 4 is a depiction of the numbers and coordinate designations of vertices in a quad with multiple partitions according to aspects of the present disclosure.

Next, based on the partitioning of the texture tiles into multiple partitions, the CPU 110 may then partition corresponding screen image quads in a similar manner. For example, in FIG. 4, a screen image quad 400, with four vertices at pixel coordinates (0,0), (1,0), (0,1), and (1,1), may be partitioned into N number of partitions 411-417 in partitioned screen image quad 410. In this particular example, N=7, but in other embodiments, N may be any number. Each partition 411-417 now has four vertices. For example, partition 411 has vertices at pixel coordinates (0,0), (1,0), (1, 1/N), (0,1/N). Instead of one screen image quad 400, there are now N quads, with four times the number of vertices as the original screen image quad 400.

Another aspect of the disclosure is that in some embodiments, the same number of partitioned quads may be used for all the texture tiles associated with a particular geometry or entire image on a screen. Using the same number of partitioned quads may be advantageous because the vertices of each screen image quad can be transferred to the vertex shader 121 just once. That is, if all screen image quads, such as (referring briefly back to FIG. 2) quads 201-205, have the same number of vertices, the vertices can be transferred to the vertex shader 121 one time, and the vertex shader 121 can then transform each vertex to its proper pixel coordinate on the screen (based on other information, such as the buffers 131). In contrast, if different screen image quads had a different number of partitions, multiple sets of vertices would need to be transferred to the vertex shader 121 for transformation. For example, if screen image quad 201 was not partitioned at all and just had four vertices, and screen image quad 203 was partitioned into seven partitions and had 28 vertices, the set of four vertices and the set of 28 vertices would both have to be transferred to the vertex shader 121. In some embodiments, it is contemplated that different screen image quads will be divided into differing numbers of partitions. For example, this may occur when certain images to be rendered have some significant constant-color areas but also have significant non-constant color areas. In general, the fewer differences there are with how each screen image tile is partitioned, the fewer sets of vertices need to be transferred from the CPU 110 or system memory 130 to the vertex shader, and the less memory bandwidth, processing power, and battery power are consumed.

One key component of the graphics pipeline is the vertex shader 121. In general, and as described previously, vertex shaders in the prior art apply transformations to vertices. That is, a vertex shader takes the vertices of a screen image quad and transforms them by applying a matrix to each vertex, such that they are properly mapped to screen (pixel) coordinates. In the vertex shader of the present disclosure, the vertex shader 121 still applies the vertex transformation, but it applies the transformation to the four times N number of vertices instead of the number of vertices (i.e., four) of non-partitioned quads.

Figure 5:
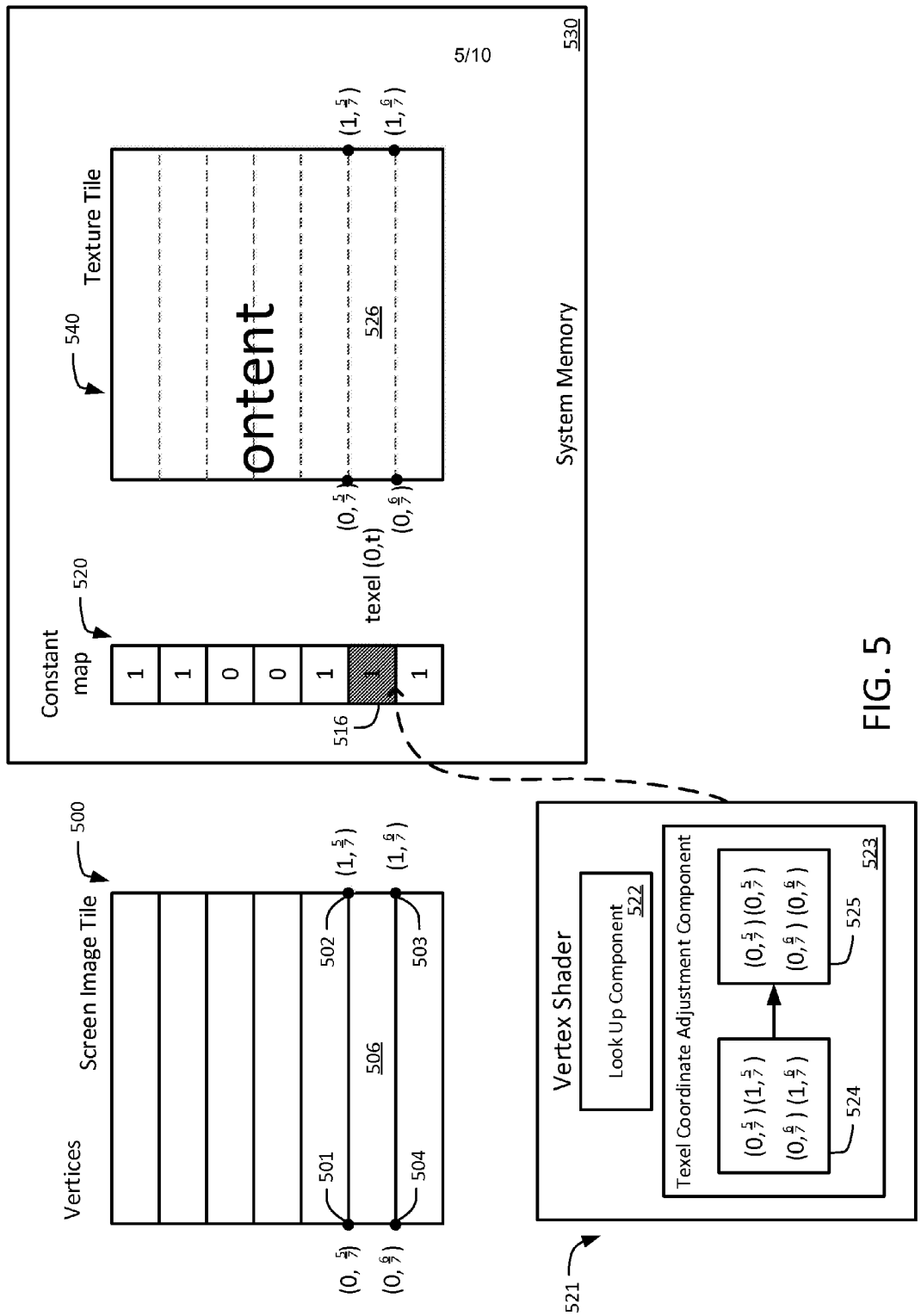
FIG. 5 is a depiction of how a vertex shader may look up values in a constant color map and transform vertices according to aspects of the present disclosure.

An aspect of the present disclosure is that the vertex shader 121, in addition to applying the normal transformations, will access (i.e., fetch) the constant color map 320 for each vertex and look up the associated value for that partition. For example, turning to FIG. 5, one screen image tile 500, which has had its vertices transformed onto pixel coordinates on a screen, may be divided into seven partitions. The partition 506, which is the sixth partition from the top, may have pixel coordinates (0, 5/7), (1, 5/7), (1,6/7), (0,6/7). Those vertices may be associated with a value 516 on the constant color map 520, which may be substantially the same as the constant color map 320 of FIG. 3. The value 516 may be 1, which indicates that the entire partition 526 of the associated texture tile 530 that should be mapped to the vertices of the screen image quad partition 506, is blank. Although in this example, the vertices are described as being transformed before accessing the constant color map 320, the vertices may actually be transformed, during, or after accessing the constant color map 320.

A look up component 522 within the vertex shader 521 may look up the value 516 in the constant color map 520 and discover that the value is 1. Then, a texel coordinate adjustment component 523 in the vertex shader 521 may change the value of the texel coordinates that are to be associated to each vertex from their original values. Specifically, the vertex shader 521 changes the first texel coordinate from its original value to zero. For example, the texel coordinate adjustment component 523 shows that the texel coordinates to be associated with each of the vertices of partition 506 are changed from original associated texel coordinates 524, which were (0,5/7), (1,5/7), (1,6/7), (0,6/7) to new associated texel coordinates 525, which are (0,5/7), (0,5/7), (0,6/7), (0,6/7). The new associated texel coordinates 525 are therefore associated with the vertices 501, 502, 503, and 504 of partition 506. The advantages of setting the first of the texel coordinates to zero may become apparent with regard to the function of the pixel shader 123.

Referring back to FIG. 1, upon receiving input from the vertex shader 121, the pixel shader 123 actually outputs the final color and alpha (i.e., depth) of each pixel. Pixel shaders in general typically access a color from a particular texel on a texture tile in memory. Each pixel requires the pixel shader to look up the corresponding texel from the associated texture tile. The way a pixel shader typically knows which texel to fetch is by interpolating the texel coordinates that are associated with the pixel coordinates at the vertices of a given quad, which are given by the vertex shader. For example, turning to FIG. 6, the diagram on top illustrates how a vertex shader 610 and pixel shader 623, working together, fetch textures in the prior art. A screen image quad 600 has had its vertices transformed (by the vertex shader 610) such that they correspond to actual pixels on a screen, at pixel coordinates (0,0) 601, (1,0) 602, (1,1) 603, and (0,1) 604. Depicted in smaller type below each pixel coordinate 601-604 is the associated texel coordinate (0,0) 605, (1,0) 606, (1,1) 607, and (1,0) 608 assigned by the vertex shader 610. A pixel shader 623 is responsible for fetching the appropriate color for each pixel in the screen image quad 600, such as pixel 611, 612, 613, 614, etc. from the corresponding texture tile 640. In actual implementation, a pixel shader may have to fetch thousands of individual texels. For example, in a screen image quad that is 256 pixels wide by 256 pixels high, the pixel shader will have to fetch 65,536 (256×256) texels from system memory 630, which consumes a high amount of memory bandwidth. The way the pixel shader 623 identifies which texels to fetch is by receiving the associated texel coordinates 605-608 from the vertex shader 610, and then interpolating those values to receive a texel value (or texel coordinate). As shown, the associated texel coordinates 605-608 are provided to the interpolator 624, and as a result, the pixel shader fetches each appropriate texel from the texture tile 640. In the prior art example, neither the screen image quad 600 nor the texture tile 640 are divided into partitions.

Figure 6A:
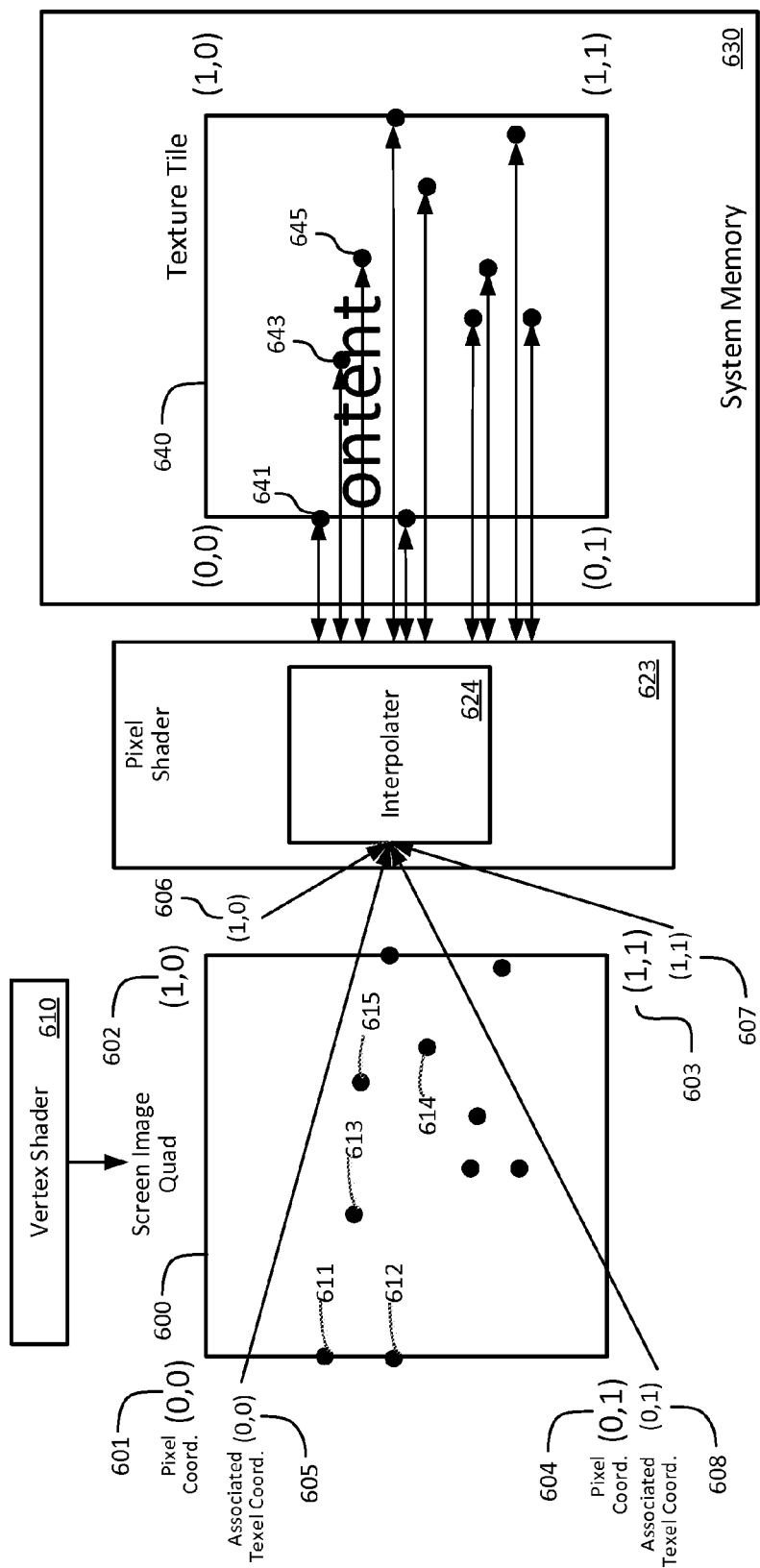
FIG. 6A is a depiction of how a pixel shader in the prior art may interpolate vertices of a quad that is not partitioned and how the pixel shader may access texels in a texture tile according to aspects of the present disclosure.

The manner of fetching texels in the example of FIG. 6A may be appropriate for certain sections of the image to be displayed. In particular, the non-blank areas of the image require the exact corresponding texel from the texture tile to render the image properly. For example, the area of the screen image quad 600 that will be shaded to display the portion of the word "content" needs the appropriate black and white pixels in various locations. The pixels 611 and 612 will require white pixels, and the pixels 613 and 615 will require black pixels. Therefore, it is appropriate for the pixel shader to fetch one texel in texture tile 640 for each pixel in the screen image quad 600. However, it is redundant, and expensive in terms of memory bandwidth and processing power, to fetch hundreds or thousands of identical white texels from different locations to shade hundreds or thousands of white pixels next to each other on a screen. In embodiments of the present disclosure, it is contemplated that for non-blank partitions (e.g., those associated with a value of "0" in the constant color map 320 of FIG. 3), the method of fetching texels will be substantially similar to the example in FIG. 6A, because the vertex shader would not set the first coordinates of the associated texel coordinates to zero.

Figure 6B:
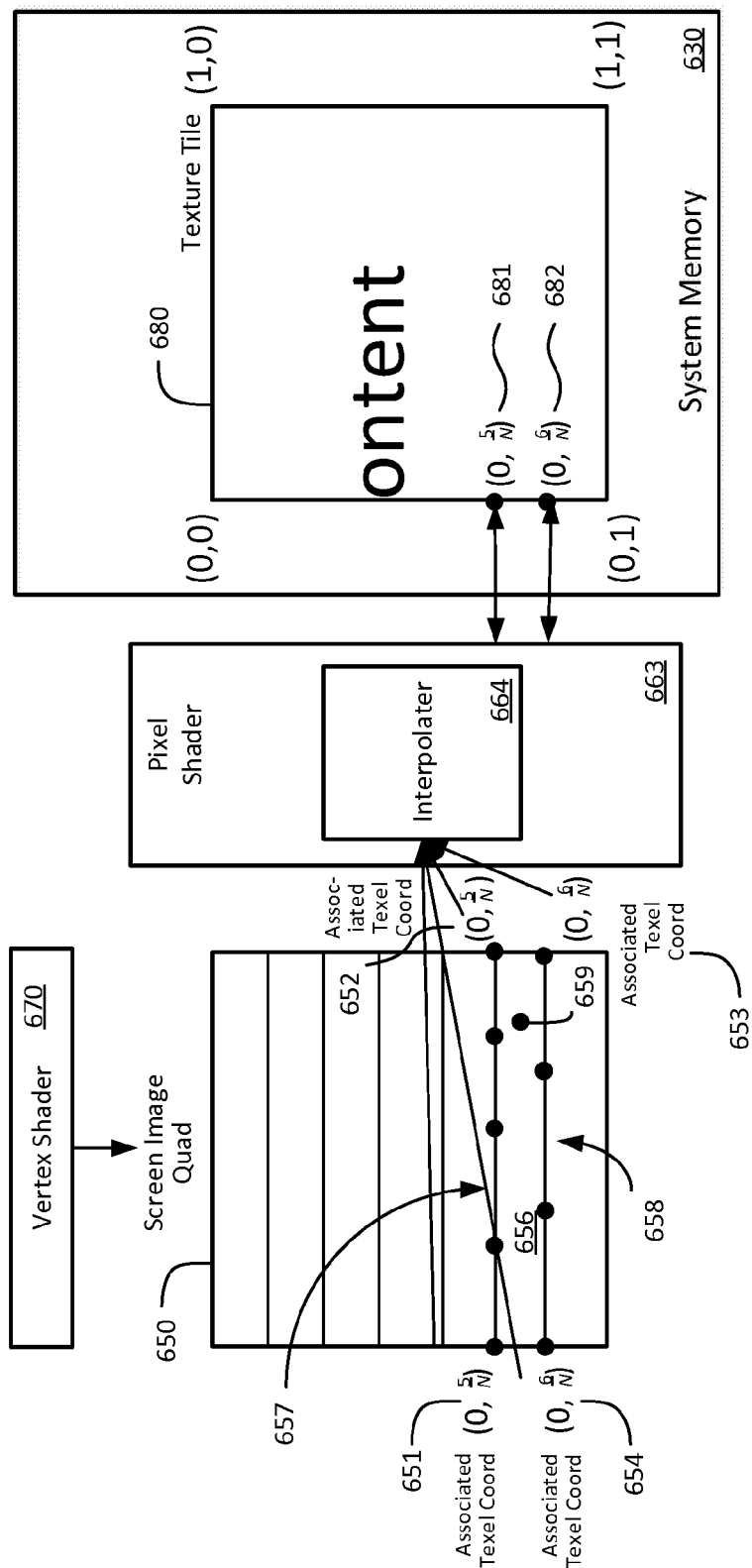
FIG. 6B depicts an embodiment of the present disclosure that shows how a vertex shader may set associated texel coordinates to zero to reduce texture fetches from memory by the pixel shader.

Referring now to FIG. 6B, screen image quad 650 illustrates a partitioned quad according to embodiments of the present disclosure. As shown, the partition 656 has four vertices that have been transformed and associated with pixels on a screen. For simplicity, the pixel coordinates are not shown, but may have values of (0,5/N), (1,5/N), (1, 6/N), (0,6/N). The associated texel coordinates assigned to the pixel coordinates by the vertex shader 670 of the present disclosure are shown, and all of their first coordinates are set to zero. That is, associated texel coordinates 651 and 652 are both set to (0,5/N), and associated texel coordinates 653 and 654 are both sent to (0,6/N). When these associated texel coordinates are sent to the interpolator 664 of the pixel shader 663, the interpolator 664 will calculate the same value, (0,5/N) for each pixel located on the x-axis 657 at the y-coordinate 5/N. Therefore, the pixel shader will only fetch from one texel location on the texture tile 680, which is texel coordinate (0,5/N) 681. An advantage of having the vertex shader 670 (which may be substantially the same as vertex shader 121 of FIG. 1) set the associated texel coordinates 651 and 652 first coordinate to zero is that, instead of fetching a texture for each of the 256 pixels along the x-axis 657, from different locations the pixel shader 663 only needs to fetch one texture from one location. Similarly, any pixel along the x-axis 658 with a y-coordinate of 6/N may fetch a texture from the texel 658 located at (0,6/N) on the texture tile 680.

It is contemplated that in embodiments of the present disclosure wherein the vertex shader only sets the first associated texel coordinate to zero, pixels that are not located on the x-axis may have to have their y-coordinates interpolated. For example, the pixel 659, when interpolating the values from the associated texel coordinates of partition 656, may have an interpolated x-coordinate of 0 and an interpolated y-coordinate of some value between 5/N and 6/N. The corresponding texel for the pixel 659 to have fetched, then, would be a corresponding texel in between texels (0,5/N) 681 and (0,6/N) 682. The number of texels in between 681 and 682 may be, for example 32 texels, if the screen image quad 650 were 256 pixels high and divided into eight partitions. In such an example, there would still only be 32 locations (texels) from which to fetch the appropriate texture for each of the 9,216 (256 pixels wide× 32 pixels high) pixels in the partition 656.

Figure 7:
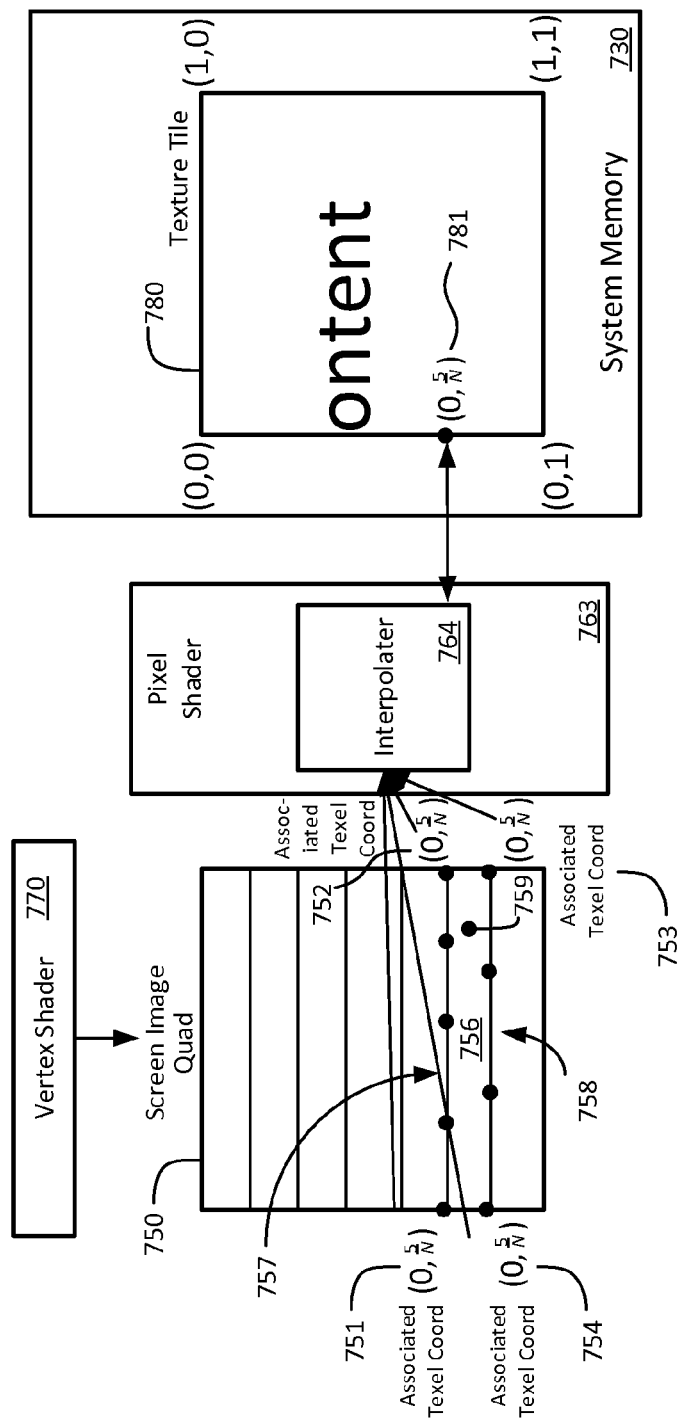
FIG. 7 depicts another embodiment of the present disclosure that shows how a vertex shader may set associated texel coordinates to reduce texture fetches by the pixel shader.

In another embodiment of the disclosure, the vertex shader may set both the first associated texel coordinate (e.g., x-coordinate) to zero, and set the second associated texel coordinate (e.g., y-coordinate) to a constant texel coordinate within the partition of the associated texture tile. This embodiment may further reduce the number of texture fetches required by the pixel shader. Turning to FIG. 7, shown is a similar diagram to FIG. 6B, which shows that associated texel coordinates 751, 752, 753, and 754 are all set to (0,5/N). As a result, any pixel within the partition 756 will have a texel coordinate value interpolated to (0,5/N). For example, even the pixel 759 will have a texel coordinate value interpolated to (0,5/N). Therefore, only one texel location, texel 781 at texel coordinate (0/5/N) in the texture tile 780, will be fetched by the pixel shader 773.

It is contemplated that the method of partitioning, the creation of the constant color map, and the vertex shader 121 of the present disclosure may be utilized with existing pixel shaders as known in the art. Because the vertex shader 121 sets the associated texel coordinates, pixel shaders may interpolate normally, but the result of the interpolation will result in the same texel coordinates. Therefore, a pixel shader, which normally consumes a high amount of memory bandwidth, may have its memory bandwidth requirements drastically reduced by fetching hundreds or thousands of pixel colors from a single location in a texture, due to the functionality of the vertex shader 121 of the present disclosure.

Embodiments disclosed herein provide an improved user experience and/or reduced power consumption relative to prior approaches. In some variations, additions and modifications readily apparent to one of ordinary skill in the art—in light of this disclosure—may be made to an existing browser engine. For example, a WebKit engine may be modified to effectuate the methodology and functionality discussed herein.

Embodiments may be realized by content display devices such as smartphones, netbooks, gaming devices, PDAs, desktop computers, televisions, tablets, and laptop computers, and the content display devices may include any of a variety of applications that a user interacts with to request, retrieve and view content such as a web browser, or any of a variety of other applications that utilize animated content (e.g., gaming, utility, and educational apps).

Figure 8:
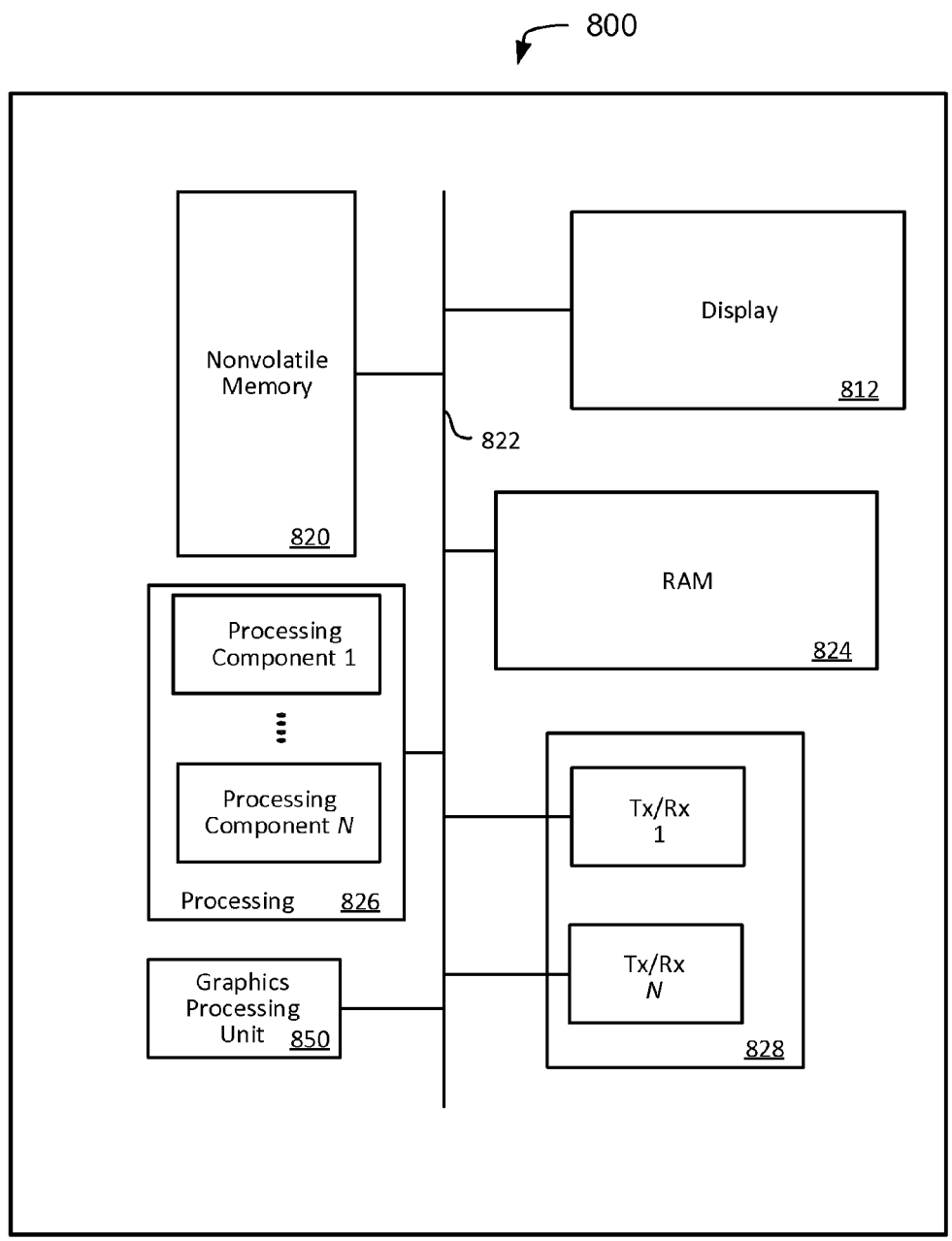
FIG. 8 is a logical block diagram of a computer that may implement aspects of the present disclosure.

Referring next to FIG. 8, shown is a block diagram depicting physical components of an exemplary content display device 800 that may be utilized to realize a content display device. As shown, the content display device 800 in this embodiment includes a display portion 812, and nonvolatile memory 820 that are coupled to a bus 822 that is also coupled to random access memory ("RAM") 824, a processing portion (which includes N processing components) 826, a transceiver component 828 that includes N transceivers, and a graphics processing component 850. Although the components depicted in FIG. 8 represent physical components, FIG. 8 is not intended to be a hardware diagram; thus many of the components depicted in FIG. 8 may be realized by common constructs or distributed among additional physical components. Moreover, it is certainly contemplated that other existing and yet-to-be developed physical components and architectures may be utilized to implement the functional components described with reference to FIG. 8.

This display portion 812 generally operates to provide a presentation of content to a user; for example, the display portion 812 may contain pixels upon which vertices are associated to and to which colors from texture tiles are applied. In several implementations, the display is realized by an LCD or OLED display. In general, the nonvolatile memory 820 functions to store (e.g., persistently store) data and executable code including code that is associated with the functional components described herein. In some embodiments for example, the nonvolatile memory 820 includes bootloader code, modem software, operating system code, file system code, and code to facilitate the implementation of one or more portions of the web browser components.

In many implementations, the nonvolatile memory 820 is realized by flash memory (e.g., NAND or ONENAND™ memory), but it is certainly contemplated that other memory types may be utilized as well. Although it may be possible to execute the code from the nonvolatile memory 820, the executable code in the nonvolatile memory 820 is typically loaded into RAM 824 and executed by one or more of the N processing components in the processing portion 826. In many embodiments, the system memory 130 may be implemented through the nonvolatile memory 820, the RAM 824, or some combination thereof.

The N processing components in connection with RAM 824 generally operate to execute the instructions stored in nonvolatile memory 820 to effectuate the functional components described herein. As one of ordinarily skill in the art will appreciate, the processing portion 826 may include a video processor, modem processor, DSP, and other processing components. The graphics processing unit (GPU) 850 depicted in FIG. 8 may be used to realize the graphics processing unit functions described herein. For example, the GPU 850 may implement the vertex shader 121 and the pixel shader 123.

The depicted transceiver component 828 includes N transceiver chains, which may be used for communicating with external devices via wireless networks. Each of the N transceiver chains may represent a transceiver associated with a particular communication scheme.

Figure 9:
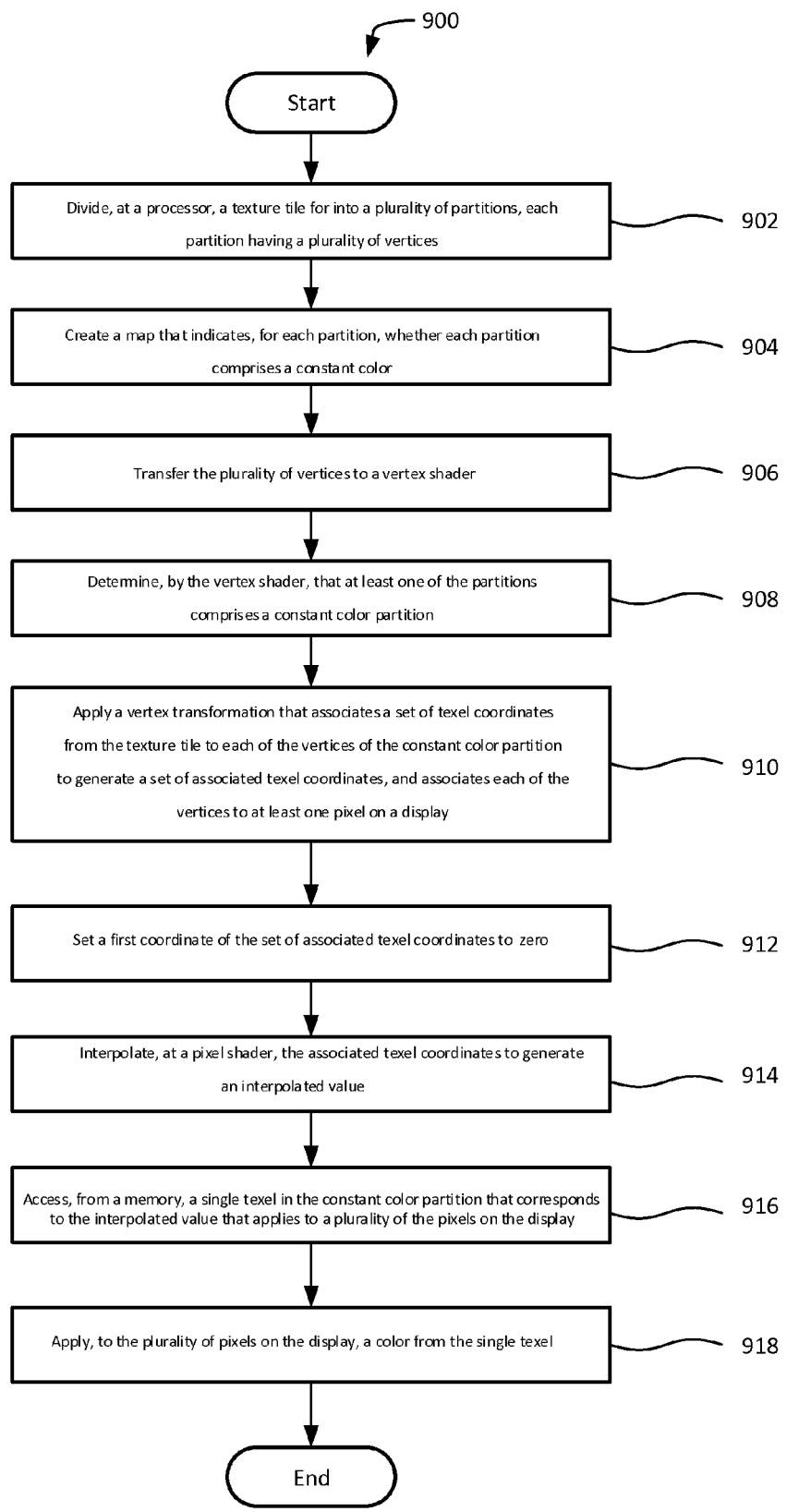
FIG. 9 is a flowchart which may be traversed to depict a method in accordance with embodiments of the disclosure.

FIG. 9 is a flowchart which may be traversed to depict a method 900 in accordance with embodiments of the disclosure. First, at 902, the method may comprise dividing, at a processor (e.g., CPU 110), a texture tile into a plurality of partitions, each partition having a plurality of vertices. Then, at 904, the method may comprise creating a map (e.g., also at the CPU 110) that indicates, for each partition, whether each partition comprises a constant color. At 906, the method includes transferring the plurality of vertices to a vertex shader, which may be implemented by transferring from the memory 130 to the GPU 120. At 908, the method includes determining, by the vertex shader 121, that at least one of the partitions comprises a constant color partition. Next, at 910, the method may include applying (e.g., by the vertex shader 121) a vertex transformation that associates a set of texel coordinates from the texture tile to each of the vertices of the constant color partition to generate a set of associated texel coordinates, and also associates each of the vertices to at least one pixel on a display. At 912, the method may comprise setting a first coordinate of the set of associated texel coordinates to zero, which may be implemented by the vertex shader 121. Then, at 914, the method may include interpolating, at a pixel shader 123, the associated texel coordinates to generate an interpolated value. At 916, the method may include accessing, from a memory (e.g., system memory 130), a single texel in the constant color partition that corresponds to the interpolated value that applies to a plurality of the pixels on the display. Finally, at 918, the method may include applying, to the plurality of pixels, a color from the single texel, which may be implemented by the pixel shader 123.

In conclusion, embodiments of the present invention reduce memory bandwidth, improve the display of content (e.g., in terms of speed and/or performance) and/or reduce power consumption. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

What is claimed is:

1. A method for rendering computer graphics onto a screen, the method comprising:
   dividing, at a processor, a texture tile into a plurality of partitions, each partition comprising a plurality of texels and each partition having a plurality of vertices;
   creating a map that indicates, for each partition, whether each partition comprises a constant color throughout the entirety of the partition;
   transferring the plurality of vertices to a vertex shader;
   determining, by the vertex shader, that at least one of the plurality of partitions comprises a constant color partition;
   applying a vertex transformation that:
      associates a set of texel coordinates from the texture tile to each of the vertices of the constant color partition to generate a set of associated texel coordinates, and
      associates each of the vertices to at least one pixel on a display,
   setting each first coordinate of the set of associated texel coordinates to zero, wherein the setting includes setting any non-zero first coordinates of the set of associated texel coordinates to zero,
   interpolating, at a pixel shader, the associated texel coordinates each having had their first coordinates set to zero, to generate an interpolated value, wherein a resulting first coordinate of the interpolated value is zero,
   accessing, from a memory, a single texel having a first coordinate of zero in the constant color partition that corresponds to the interpolated value that applies to a plurality of the pixels on the display,
   applying, to the plurality of pixels on the display, a color from the single texel.

2. The method of claim 1, wherein:
   dividing further comprises dividing a plurality of texture tiles with the same number of partitions per tile; and
   transferring the plurality of vertices comprises transferring the plurality of vertices of a single texture tile to the vertex shader.

3. The method of claim 2, further comprising:
   associating the plurality of vertices with a plurality of pixels on the display, wherein the plurality of pixels form a plurality of geometries;
   applying the plurality of vertices from a single texture tile to the plurality of geometries.

4. The method of claim 1, wherein the geometry is a two-dimensional geometry.

5. The method of claim 1, wherein each partition has four vertices.

6. The method of claim 1, wherein the map indicates whether a partition has a constant color by assigning a value of one on a portion of the map.

7. The method of claim 1, further comprising;
setting a second coordinate for each one of the set of associated texel coordinates that are associated with each of the vertices of the constant color partition to the same value.

8. A graphics rendering device comprising;
a processor configured to:
   divide a texture tile into a plurality of partitions, each partition comprising a plurality of texels and each partition having a plurality of vertices, and
   create a map that indicates, for each partition, whether each partition comprises a constant color throughout the entirety of the partition;
a memory configured to store the plurality of vertices and the texture tile;
a display;
a vertex shader configured to:
   determine that at least one of the plurality of partitions comprises a constant color partition;
   apply a vertex transformation that:
      associates a set of texel coordinates from the texture tile to each of the vertices of the constant color partition, and
      associates each of the vertices to pixels on the display, and
      sets each first coordinate of the set of associated texel coordinates to zero, wherein the setting includes setting any non-zero first coordinates of the set of associated texel coordinates to zero,
a pixel shader configured to:
   interpolate the associated texel coordinates each having had their first coordinates set to zero, to generate an interpolated value, wherein a resulting first coordinate of the interpolated value is zero,
   access, from the memory, a single texel having a first coordinate of zero in the constant color partition that corresponds to the interpolated value that applies to a plurality of the pixels on the display,
   apply, to the plurality of pixels on the display, a color from the single texel.

9. The graphics rendering device of claim 8, wherein the processor is further configured to:
divide a plurality of texture tiles with the same number of partitions per tile, and
transfer the plurality of vertices of a single texture tile to the vertex shader.

10. The graphics rendering device of claim 9, wherein the vertex shader is further configured to:
associate the plurality of vertices with a plurality of pixels on the display, wherein the plurality of pixels form a plurality of geometries, and
apply the plurality of vertices from a single texture tile to the plurality of geometries.

11. The graphics rendering device of claim 8, wherein the geometry is a two-dimensional geometry.

12. The graphics rendering device of claim 8, wherein each partition has four vertices.

13. The graphics rendering device of claim 8, wherein the map indicates whether a partition has a constant color by assigning a value of one on a portion of the map.

14. The graphics rendering device of claim 8, wherein the vertex shader is further configured to:
set a second coordinate for each one of the set of associated texel coordinates that are associated with each of the vertices of the constant color partition to the same value.

15. A non-transitory, tangible computer readable storage medium, encoded with processor readable instructions to perform a method for rendering computer graphics onto a screen, the method comprising:
dividing, at a processor, a texture tile into a plurality of partitions, each partition comprising a plurality of texels and each partition having a plurality of vertices;
creating a map that indicates, for each partition, whether each partition comprises a constant color throughout the entirety of the partition;
transferring the plurality of vertices to a vertex shader;
determining, by the vertex shader, that at least one of the plurality of partitions comprises a constant color partition;
applying a vertex transformation that:
   associates a set of texel coordinates from the texture tile to each of the vertices of the constant color partition to generate a set of associated texel coordinates, and
   associates each of the vertices to at least one pixel on a display,
setting each first coordinate of the set of associated texel coordinates to zero, wherein the setting includes setting any non-zero first coordinates of the set of associated texel coordinates to zero,
interpolating, at a pixel shader, the associated texel coordinates each having had their first coordinates set to zero, to generate an interpolated value, wherein a resulting first coordinate of the interpolated value is zero,
accessing, from a memory, a single texel having a first coordinate of zero in the constant color partition that corresponds to the interpolated value that applies to a plurality of the pixels on the display,
applying, to the plurality of pixels on the display, a color from the single texel.

16. The non-transitory, tangible computer readable storage medium of claim 15, wherein:
dividing further comprises dividing a plurality of texture tiles with the same number of partitions per tile; and
transferring the plurality of vertices comprises transferring the plurality of vertices of a single texture tile to the vertex shader.

17. The non-transitory, tangible computer readable storage medium of claim 16, wherein the method includes:
associating the plurality of vertices with a plurality of pixels on the display, wherein the plurality of pixels form a plurality of geometries;
applying the plurality of vertices from a single texture tile to the plurality of geometries.

18. The non-transitory, tangible computer readable storage medium of claim 15, wherein the geometry is a two-dimensional geometry.

19. The non-transitory, tangible computer readable storage medium of claim 15, wherein the map indicates whether a partition has a constant color by assigning a value of one on a portion of the map.

20. The non-transitory, tangible computer readable storage medium of claim 15, wherein the method includes:
setting a second coordinate for each one of the set of associated texel coordinates that are associated with each of the vertices of the constant color partition to the same value.

* * * * *